No. 896,063.

W. C. MARSH.
BRAKE.
APPLICATION FILED NOV. 29, 1907.

PATENTED AUG. 11, 1908.

5 SHEETS—SHEET 1.

Witnesses.
L. M. Gaugster,
George A. Neubauer

Inventor
William C. Marsh.
By  Attorney.

No. 896,063. PATENTED AUG. 11, 1908.
W. C. MARSH.
BRAKE.
APPLICATION FILED NOV. 29, 1907.

5 SHEETS—SHEET 2.

Witnesses.
L. M. Sangster.
George A. Neubauer

William C. Marsh. Inventor.
By A. J. Sangster, Attorney.

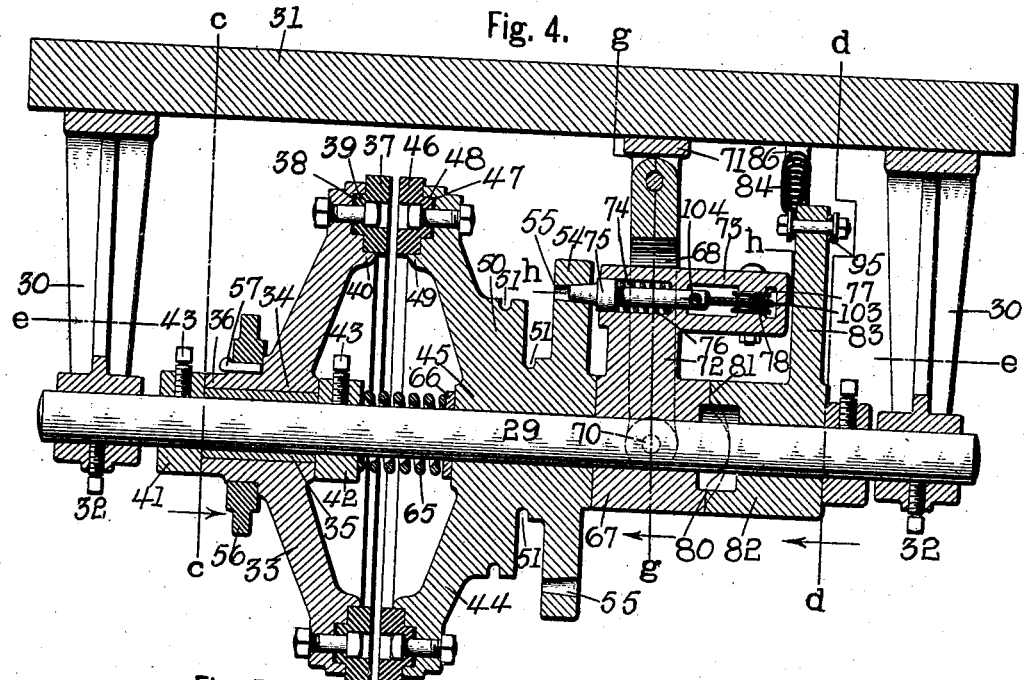

No. 896,063.
W. C. MARSH.
BRAKE.
APPLICATION FILED NOV. 29, 1907.
PATENTED AUG. 11, 1908.
5 SHEETS—SHEET 4.
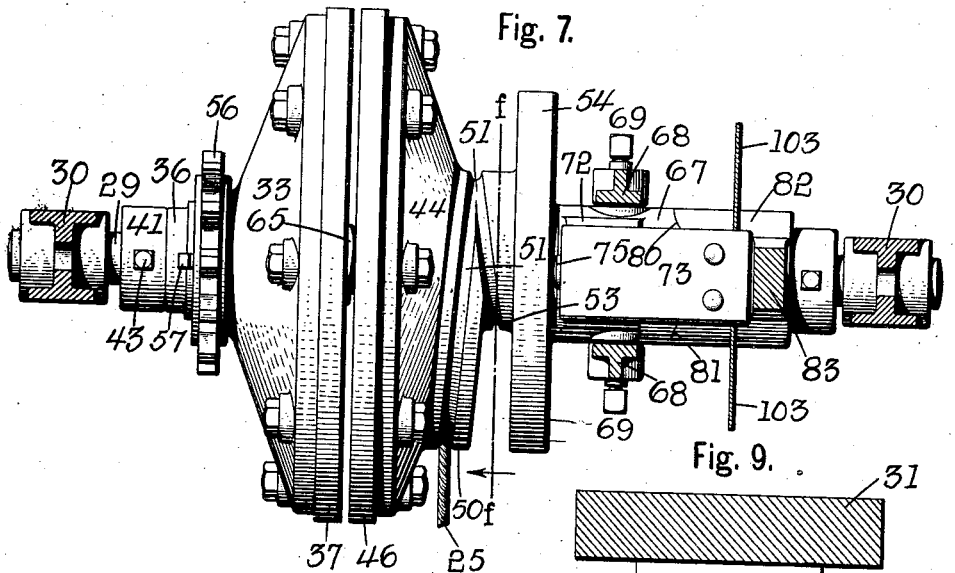
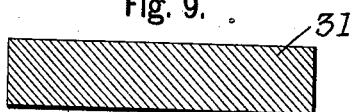
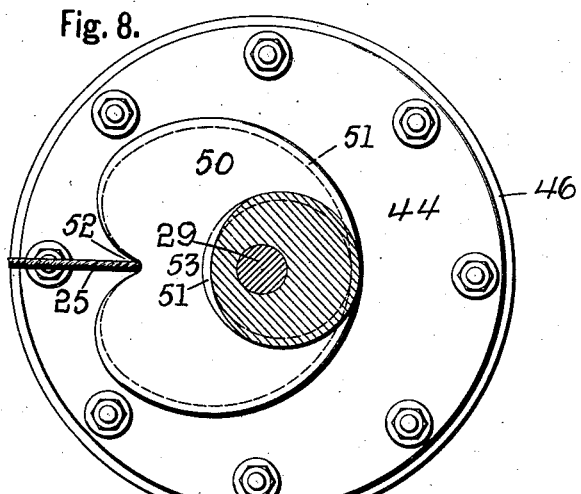
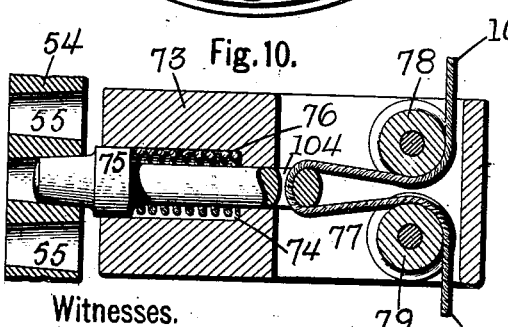
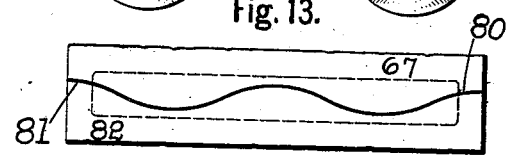
Witnesses.
L. M. Sangster.
George A. Neubauer.
Inventor.
William C. Marsh.
By A. Sangster, Attorney.

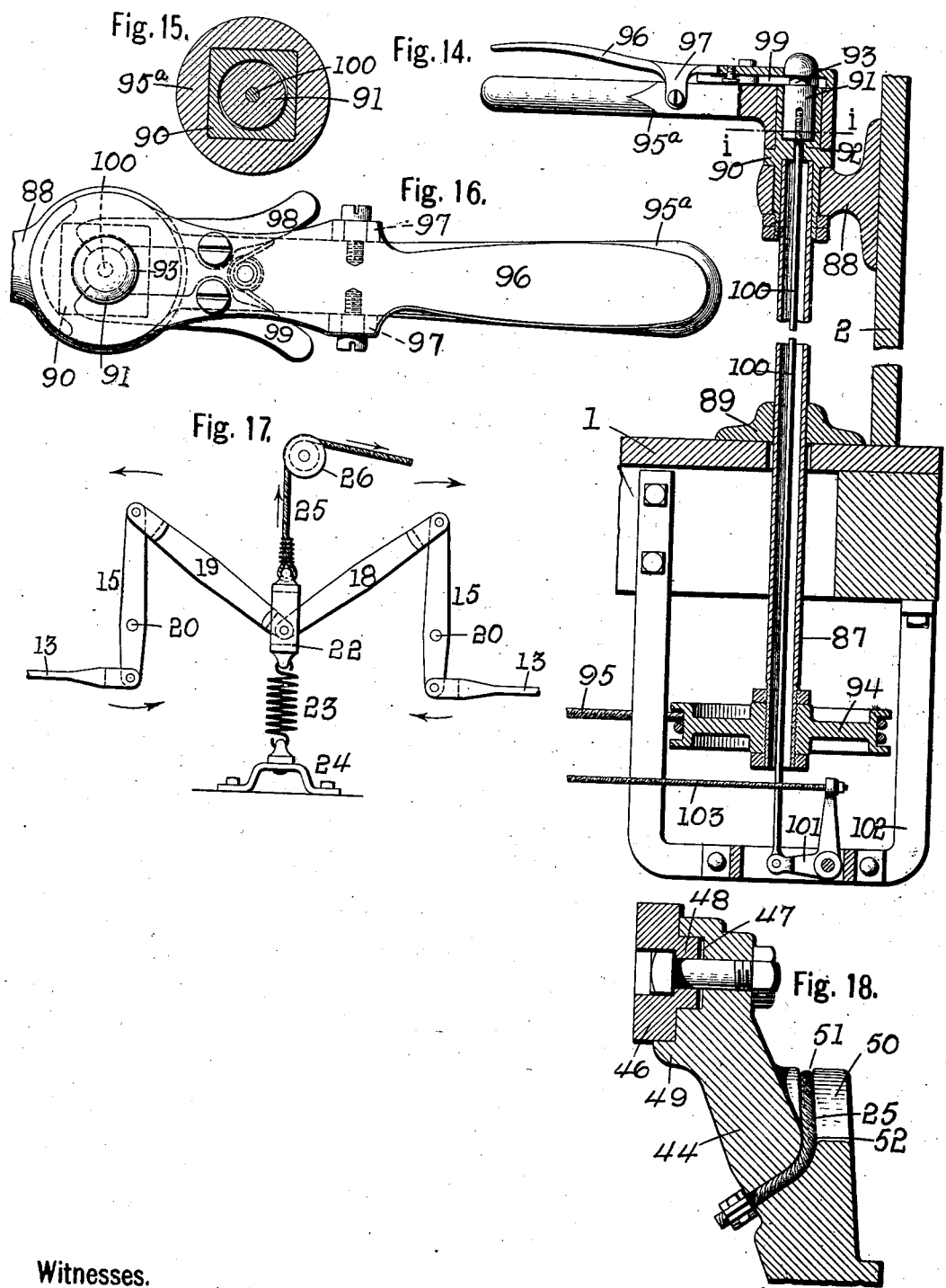

UNITED STATES PATENT OFFICE.

WILLIAM C. MARSH, OF DUNKIRK, NEW YORK.

BRAKE.

No. 896,063.  Specification of Letters Patent.  Patented Aug. 11, 1908.

Application filed November 29, 1907. Serial No. 404,394.

*To all whom it may concern:*

Be it known that I, WILLIAM C. MARSH, a citizen of the United States, residing at Dunkirk, in the county of Chautauqua and State of New York, have invented a certain new and useful Improved Brake, of which the following is a specification.

This invention relates to an improved brake for street railway cars or the like and the main object of the invention is to provide friction means for applying the brake.

The invention also relates to certain details of construction, which will be fully and clearly hereinafter described and claimed, reference being had to the accompanying drawings in which adaptations of the invention are shown.

Figure 1:
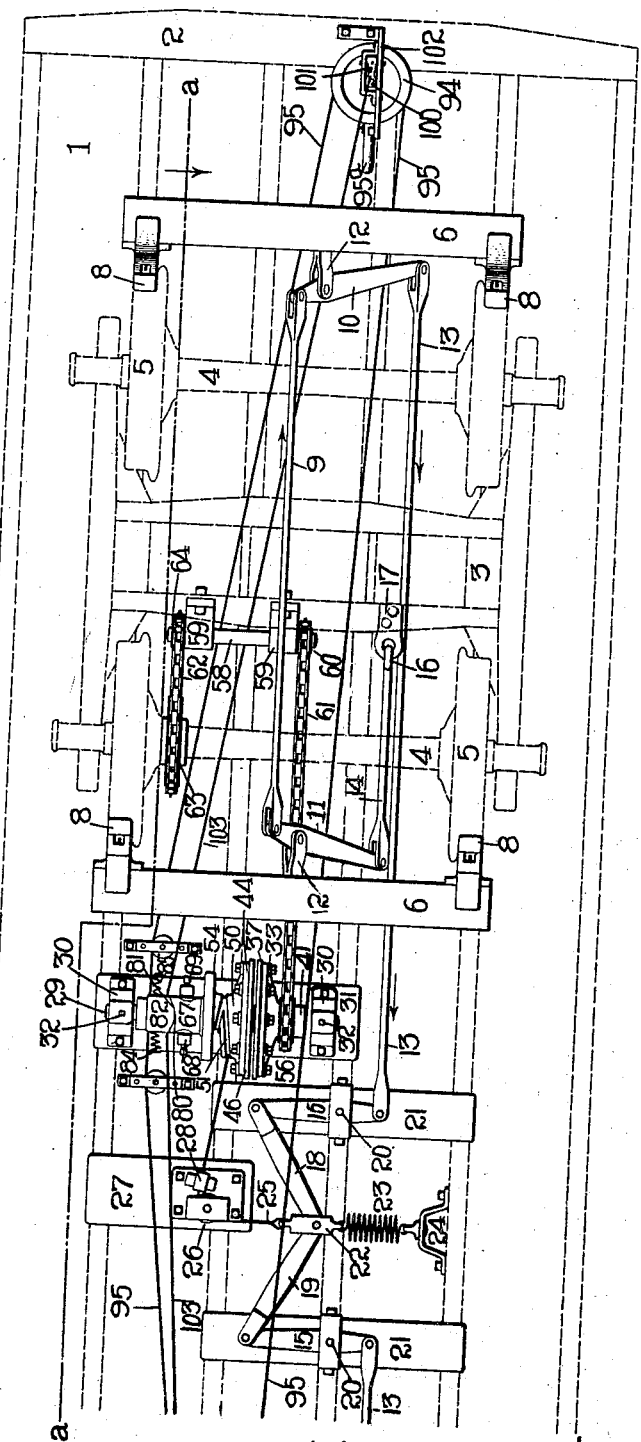
Figure 1:
Figure 2:
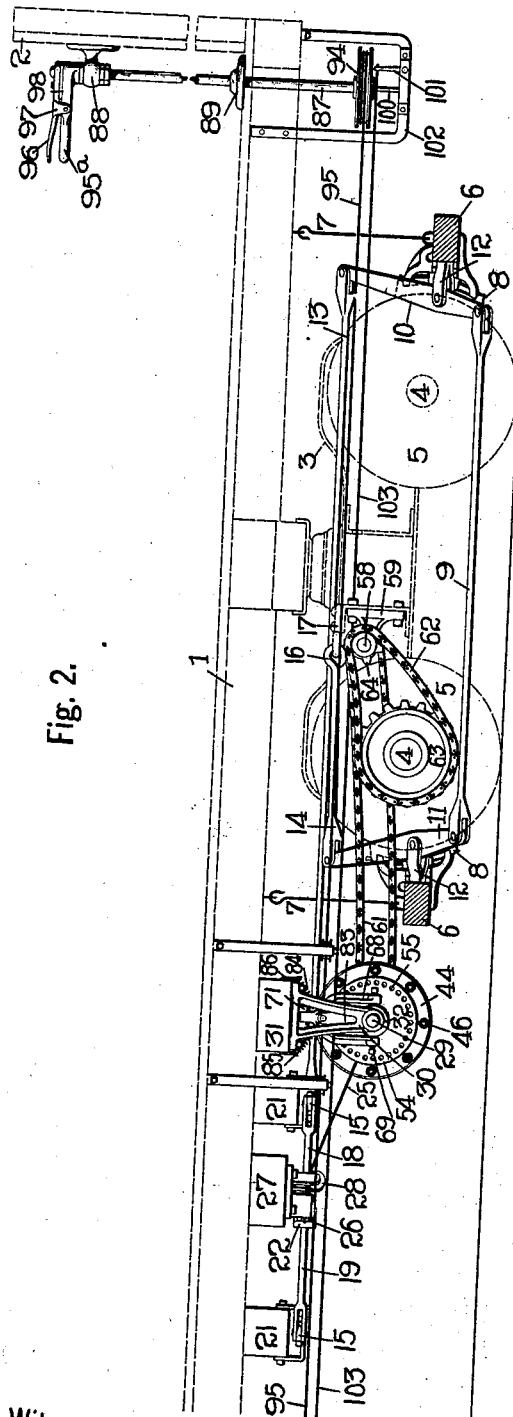
Figure 3:
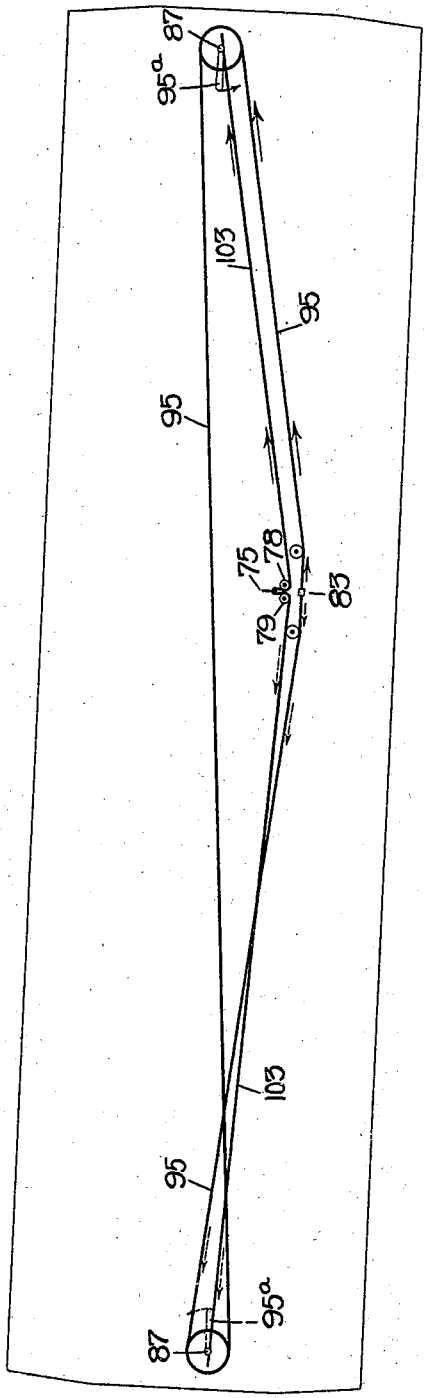

Figure 1 is a bottom view of a street car or the like, equipped with the improved brake, the car body and the truck being shown in dotted lines. Fig. 2 is a longitudinal section on line *a a*, Fig. 1, the car body and the truck being shown in dotted lines. Fig. 3 is a diagrammatic view of the means for controlling the brake, the car body being shown in outline. Fig. 4 is a central longitudinal section through the brake setting mechanism on line *b b*, Fig. 5. Fig. 5 is a transverse section through the brake setting mechanism on line *c c*, Fig. 4. Fig. 6 is a transverse section through the brake setting mechanism on line *d d*, Fig. 4. Fig. 7 is a top plan view of the brake setting mechanism, a horizontal section being taken through the hangers and the crank arm on line *e e*, Fig. 4. Fig. 8 is a transverse section through the slidable friction clutch member and the shaft on line *f f*, Fig. 7. Fig. 9 is a transverse section on line *g g*, Fig. 4. Fig. 10 is an enlarged horizontal section on line *h h*, Fig. 4. Fig. 11 is a detached end elevation of the sliding cam sleeve mounted on the horizontal shaft. Fig. 12 is a detached end elevation of the rocking cam sleeve mounted on the horizontal shaft. Fig. 13 is a diagrammatic view showing the contour of the cam faces of the sliding cam sleeve and the rocking cam sleeve. Fig. 14 is a central vertical section through one of the controlling devices located at the ends of the car for controlling the operation of the brake. Fig. 15 is an enlarged transverse section on line *i i*, Fig. 14. Fig. 16 is an enlarged plan view of the operating handle of the controlling device, also showing a fragment of the upper bracket. Fig. 17 is an enlarged detached bottom view of the toggle brake setting levers. Fig. 18 is an enlarged fragmentary transverse section through the slidable member of the friction clutch showing the manner of securing the cable thereto.

In referring to the accompanying drawings in detail like numerals designate like parts.

While the improved brake is illustrated in the drawings as attached to the body of a street car of conventional type, it is equally adapted for and may be secured with but slight alterations to railway coaches, Pullman cars, automobiles and all other cars or vehicles.

For the purpose of clearly showing the brake construction and its operation only the base 1, car end 2 and truck 3 of a car are shown and these parts are in dotted lines to bring into bold relief the novel features of this improvement. The usual axles 4 are journaled in the truck upon which are mounted the car wheels 5.

The form of brake proper shown in the drawing consists of transverse brake beams 6 which are hung by pivotal links 7 from the car base 1, and carry brake shoes 8 adapted to engage the periphery of the car wheels 5. The brake beams 6 are arranged in pairs, one pair for each truck and as they are similar for each truck illustrations and a description of the brakes for one truck will suffice for both. The beams 6 are located on opposite sides of the wheels of the front and rear car axles as shown in Figs. 1 and 2 and are connected to each other by a short connecting rod 9 which is pivoted at its respective ends to the short sections of floating levers 10 and 11 which in turn are pivoted at intermediate points to forked fulcrum blocks 12 attached to the brake beams.

The lever 10 which is located at the outer end of the truck near the car end forms a live floating lever and the lever 11 located at the inner end of the truck constitutes a dead floating lever. These levers extend on an incline or obliquely with respect to the car axles and brake beams, see Figs. 1 and 2. The upper longer section of the live floating lever 10 is pivoted at its end to one end of a longitudinal connecting rod 13 and the upper longer section of the dead floating lever is pivoted at its end to one end of a connecting rod 14. The opposite end of the connecting rod 13 is pivoted to a horizontal brake lever 15 and the opposite end of the connecting rod 14 is provided with an eye 16, which interlocks with the eye in an eye bracket 17 fastened to one of the cross beams of the truck see Fig. 1. Two of the horizontal brake levers 15 are employed one of which is connected to and controls the brake mechanism of each truck and they are connected together by toggle levers 18 and 19. The brake levers are fulcrumed on pivotal pins 20 fastened to transverse beams 21 attached to the car base. The toggle levers 18 and 19 are pivoted at their opposite outer ends to the brake levers and pivotally connected at their inner ends by a pivotal block 22. The toggle levers together with the brake levers constitute a toggle joint mechanism which acts to move the brakes quickly at first and then gradually slows down as the toggle levers turn from an angular position into longitudinal alinement thus slowing the speed of application as the brake is applied while increasing the leverage and power of application. The outer end of the block 22 is fastened to one end of a spiral spring 23 and the outer end of this spring 23 is fastened to a bracket 24, bolted to the car base, see Fig. 1. This spiral spring serves to maintain the toggle levers in angular position and the brakes in non-braking position and to return them to said position after the brake is applied and released and the power removed.

A wire cable 25, has one end fastened to the inner extremity of the block 22, and extends transversely to a horizontal pulley 26, fastened to a beam 27, around which it bends thence to and around a vertical pulley 28, also attached to the beam 27, and then forwardly to one member of a friction mechanism to which it is fastened in a manner to be hereinafter described. The friction brake setting mechanism has a friction clutch consisting of two members, which are rotatably mounted on a stationary shaft 29, hung in depending brackets 30 from a transverse beam 31 of the car. The stationary shaft 29 is fastened rigidly in the openings in the brackets 30 through which it passes by set screws 32, see Fig. 4.

One of the members of the friction clutch which will hereinafter be termed the non-slidable friction member is rotated continuously while the car is traveling and the other member which will be hereinafter termed the slidable friction member is rotated only when frictionally contacting with the non-slidable member. The non-slidable friction member consists of a circular dished body 33, a hub 34 which is lined with anti-friction metal 35, and has a reduced side extension 36, and a friction ring 37 which is bolted to the margin of the inner side of the body.

To support the friction ring 37 very firmly in place a circular groove 38 is formed in the margin of the body in which a rib 39, on the ring 37 extends as shown in Fig. 4. A laterally extending circular flange 40 is also formed on the body which projects against the inner edge of the friction ring to additionally strengthen the construction as the ring when in place is fitted around the flange as shown in Fig. 4. The non-slidable member is supported against sliding movement on the stationary shaft by having its hub 34 and the side extension 36 of the hub located between outer and inner collars 41 and 42 rigidly fastened to the shaft by set screws 43. The slidable friction member consists of a dished body 44 a hub 45 and a friction ring 46, which is bolted to the margin of the inner side of the body.

A circular groove 47 similar to the groove 38 is formed in the body 44 and a rib 48 similar to the rib 39 of the other friction ring only on the opposite side is formed on the friction ring 46 which extends into the groove 47, when the ring is attached to the body. The body 44 is also provided with a lateral circular flange 49 around which the ring 46, fits. The body is provided with a side cam like extension 50 which has a peculiar spiral groove 51 formed in its surface in which the wire cable 25 is adapted to wind when the slidable friction member is rotated in either direction. The groove 51 may be said to consist of two opposed sections which commence at the point 52 at which the end of the cable 25 is fastened and extend in opposite directions spirally around the cam gradually lessening their distance from the center until they meet at a point 53 which is radially inward from the point 52 and is the closest approach on the groove to the center stationary shaft, see Fig. 8. These two sections are practically similar with the exception that they extend in opposite directions so that the cable will be wound up no matter which direction the car is traveling. The cam in its larger part is in outline similar to the conventional shape of an apple bisected vertically and is substantially circular in its smaller part with the stationary shaft passing through on an offset or at one side of the center, see Fig. 8.

A disk 54 which is preferably integral with the body 44 and its cam extension 50 is provided with a series of tapering holes 55 arranged in a circular row in any one of which the tapering dog of a locking mechanism is adapted to fit to lock the slidable member against rotation and thereby hold the break in any position to which it may be set. The non-slidable member is connected by power transmitting mechanism to one of the car axles so that it is rotated continuously while the car is traveling and the axle is revolving. A sprocket 56 is fastened on the side extension 36 by a key 57 and a short transverse counter shaft 58 journaled in bearings 59 attached to one of the beams of the truck has a similar sprocket 60 which is connected to the sprocket 56, by a chain 61. The counter shaft 58 is connected to one of the axles by a second chain 62 which encircles a fairly large sprocket 63 on one of the car axles and a smaller sprocket 64 on the counter shaft 58, see Figs. 1 and 2. The two members of the friction are held normally in separated position by a spiral spring 65 which surrounds the shaft and is located between the two members. This spring has its opposite ends pressing respectively against the inner collar 42 and a washer 66 located at the inner end of the slidable friction member, see Fig. 4.

The mechanism for locking the slidable member of the friction against rotation is supported upon a sleeve 67 fitted on the stationary shaft. The sleeve 67 is loosely mounted on the stationary shaft but is prevented from rotating thereon by a yoke 68 which carries screw bolts 69 the inner plain surfaced ends 70, of which project into the openings in the sleeve see Fig. 9. The yoke 68 is pivoted by a pin between the depending ears of a bracket 71 bolted to the transverse beam 31. An extension 72 projects vertically upward from the sleeve and has a horizontal enlargement 73 at its upper end which is hollowed out to provide a chamber 74 in which a dog 75 is slidably supported. The dog has a tapering outer end which corresponds in size and taper to the circular row of holes or openings 55 in the disk 54, see Fig. 10, an intermediate enlargement and an inner reduced stem or shank. The chamber 74 is reduced at its rear end to a diameter slightly greater than the stem of the dog to provide a shoulder and a spiral spring 76 is located in the chamber around the stem of the dog with its opposite ends bearing respectively against the intermediate enlargement of the dog and the shoulder. The tendency of the spring 76 is to force the dog out into one of the holes in the disk as shown in Fig. 10. In the rear of the reduced portion of the chamber the enlargement is slotted horizontally out through its opposite sides to provide an elongated opening 77 extending horizontally through the rear portion of the enlargement 73 from side to side thereof as shown in Fig. 10. Two rollers 78 and 79 are journaled upon vertical pins in transverse position in the horizontal opening. The dog is retracted to unlock the slidable member by manually controlled mechanism which will be hereinafter described. The sleeve 67 also serves to slide the slidable friction member into contact with the non-slidable friction member being slidably moved itself on the stationary shaft by cam means.

Referring to Figs. 4, 7, 11, 12 and 13 the cam means comprises a cam surface 80 formed on the end of the sleeve 67, as shown in Fig. 11 and a cam surface 81 formed on the end of a rock sleeve 82 as shown in Fig. 12. The sleeve 82 is rockably mounted on the stationary shaft and has a crank 83 extending upward therefrom. The crank is normally balanced in vertical position between two coil springs 84 and 85 which are connected at their inner ends to the crank and at their outer ends to brackets 86 bolted to opposite sides of the beam 31, see Figs. 5 and 6. The cam surfaces 80 and 81 are complementary and are formed on the annular end of the sleeves 67 and 82 being each divided into sections of even and regular curvature so that they will always contact at all points when the friction is in an inoperative position as shown in Fig. 13 in which for the purposes of clearly illustrating the contour the regular sinuous curving of the cam surfaces are shown as upon a plane surface.

The friction mechanism and its locking and shifting mechanism are controlled by means within convenient reach of the operator. The controlling means consists of a vertical shaft 87 journaled at its upper end in a bracket 88 fastened to the car end see Fig. 14 and passing through a journal block 89, attached to the car floor, an operating lever and means connecting the shaft to the crank 83. The vertical shaft is tubular in form and has a head 90 fitted upon its upper end, the head having a bottom socket to receive the tube end as shown in Fig. 14. The head 90, has a top socket in which a cylindrical block 91, is slidably fitted and two sockets are separated by an annular inwardly extending flange 92, which forms a shoulder to limit the downward movement of the block 91. The block 91 has an encircling groove 93, near the top thereof for a purpose to be hereinafter set forth. A flanged drum 94 is mounted at the lower end of the shaft. The ends of a rope 95 are connected to the vertical crank 83 and extend in opposite directions toward the opposite ends of the car. The rope 95, extends in the form of a loop having a twist near one end and the extremities of the loop are coiled once or twice around the drums located at opposite ends of the car as shown in the diagrammatic view in Fig. 3. The operating lever is detachably fitted upon the head 90 and consists of a lower or main member 95ª having a socket to receive the upper portion of the head and a shank or handle and an upper member 96 having intermediate ears 97, which bend down and are pivoted to the main member so that the upper member has a vertical movement toward or from the main member. Two opposed locking levers 98 and 99 are pivoted to the upper member and have curved jaw portions which engage in the groove 93 in the block 91 to lock the upper member to said block. A vertical rod 100 extends through the tubular shaft 87 and is fastened at its upper end to the block 91 and at its lower end to a bell crank 101. The bell crank 101 is pivoted in a depending frame 102, bolted to the car body and is connected at its upper end to one end of a rope 103. The rope 103 extends between the bell cranks at opposite ends of the car and is bent in an intermediate portion around the rollers 78 and 79 pivoted in the horizontal opening and passed through an opening 104 in the rear end of the dog 75.

The operation of this improvement is as follows,—When it is desired to apply the brakes, the upper member 96 of the operating lever is first depressed which elevates the block 91 and rod 100 and turns the bell crank 101 and pulls upon the rope 103 which retracts the dog 75, sufficiently to unlock the slidable member and the entire lever is then turned preferably to the right which turning the drum 94, at the lower end of the shaft pulls upon the rope 95 and turns the crank 83 rocking the sleeve 82. The cam end 81 of the sleeve 82 acting against the cam end 80 of the sleeve 67 slides the slidable member in frictional engagement with the non-slidable member of the friction clutch. The rotation of the non-slidable member is now frictionally communicated to the slidable member and winds up the wire cable 25 in the cam groove 51. The pull upon the wire cable 25 is in turn communicated to the pivotal block 22, turning the toggle levers 18 and 19 from an angular position into longitudinal alinement and through the brake levers 15 and connecting rods 13 applying the brakes. When the brakes have been set to the desired force they can be locked if desired by releasing the upper member of the lever and permitting the locking dog 75 to engage in the hole in the disk which registers with said dog. The cam groove has its larger part made to about the shape of an outline of a vertically bisected apple or a cardioid curve and its lesser part to a substantially circular form around an offset center for the purpose of providing for a rapid winding of the wire cable at the beginning which gradually slows in its winding as the groove nears the center without slowing the speed of the friction brake setting mechanism and at the same time increasing the pulling power brought to bear upon the cable. By this means it will be noted that the brakes are brought very quickly into contact with the car wheels and are then more slowly but with constantly increasing power drawn firmly against the wheels.

I claim as my invention—

1. In a device of the class described, the combination with a brake, of a toggle system connecting to said brake and means driven from the car for moving the toggle system to operate the brake.

2. In a device of the class described, the combination with a brake, of a toggle system connecting to said brake and friction means for moving the toggle system to operate the brake.

3. In a device of the class described, the combination with a brake, of a toggle system connecting to said brake, a friction mechanism comprising a plurality of members, one of which is driven from the car and another of which is connected to the toggle system, and means for moving said members into frictional contact.

4. In a device of the class described, the combination with a brake, of a friction brake setting mechanism including a plurality of dished friction members, the outer flat side margins only of which are adapted to frictionally engage and are formed of frictional material separate from the material of the brake members and set in grooves in the side surface of said members, one of said members being driven from the car and another being connected to the brake, and means mechanically separate from the friction members for moving said members into frictional contact.

5. In a device of the class described, the combination with a brake, of a friction brake setting mechanism including a plurality of dished friction members having frictional devices separate from the material of said members and set in grooves in the sides of said members and having frictional surfaces of annular form which extend vertically and are flat and are adapted to frictionally engage when the friction mechanism is in brake setting position, one member of said friction mechanism being driven from the car and another member being connected to the brake, and means mechanically separate from the friction member for moving said members into frictional contact.

6. In a device of the class described, the combination with a brake, of a friction brake setting mechanism including a plurality of dished friction members having frictional devices separate from the material of said members and set in grooves in the sides of said members and having frictional surfaces of annular form which extend vertically and are flat and are adapted to frictionally engage when the frictional mechanism is in brake setting position, one member of said friction mechanism being a continuously rotatably driven member and another member being slidable and connected to the brake and means mechanically separate from the friction member for moving said members into frictional contact.

7. In a device of the class described, the combination with a brake, of a toggle system connecting to said brake and a friction brake setting mechanism connecting to the toggle system.

8. In a device of the class described, the combination with a brake, of a toggle system connecting to said brake, a friction brake setting mechanism connecting to the toggle system and controlling means for the friction brake setting mechanism.

9. In a device of the class described, the combination with a brake, of a friction brake setting mechanism comprising a plurality of members, one at least of which is provided with a removable friction ring bolted in a groove in said member and located at the extreme outer side margin of said member.

10. In a device of the class described, the combination with a brake, of a friction brake setting mechanism comprising a plurality of members, one at least of which has a body provided with a deep annular groove in its outer marginal side and a comparatively thick friction ring secured in said groove.

11. In a device of the class described, the combination with a brake, of a friction brake setting mechanism comprising a plurality of members, one at least of which has a body provided with an annular groove on its side and a friction ring attached to the body and having a rib extending into the groove.

12. In a device of the class described, the combination with a brake, of a friction brake setting mechanism comprising a plurality of members, one at least of which has a body provided with an annular groove on its side and a comparatively thick friction ring detachably fastened to said body in said groove.

13. In a device of the class described, the combination with a brake, of a friction brake setting mechanism comprising a plurality of members, one at least of which has a body provided with an annular groove on its side and a comparatively thick friction ring separate from said body and means for securing said friction ring to said body and in said groove.

14. In a device of the class described, the combination with a brake, of a friction brake setting mechanism comprising a plurality of members, one at least of which has a body provided with an annular groove on its side and a friction ring separate from said body and bolts for securing said friction ring to the side of said body.

15. In a device of the class described, the combination with a brake, of a toggle system consisting of a plurality of pivotally connected levers, means connecting the toggle system to the brake and friction means for moving the levers of said toggle system to actuate the brake.

16. In a device of the class described, the combination with a brake, of a toggle system consisting of a plurality of pivotally connected levers, means connecting the toggle system to the brake, means for maintaining the toggle system in normal position and friction means for moving the levers of said toggle system out of normal position to actuate the brake.

17. In a device of the class described, the combination with a brake, of a friction brake setting mechanism and means for positively locking the friction brake setting mechanism to hold the brake unyieldingly at any point of its adjustment.

18. In a device of the class described, the combination with a brake, of a friction brake setting mechanism comprising a continuously rotatable non-slidable member, and a slidable member connecting to the brake and means for locking the sliding member against rotation including a perforated disk and a locking dog.

19. In a device of the class described, the combination with a brake, of a friction brake setting mechanism comprising a continuously rotatable non-slidable member, and a slidable member connecting to the brake and means for locking the slidable member against rotation.

20. In a device of the class described, the combination with a brake, of a friction brake setting mechanism comprising a continuously rotatable non-slidable member, a slidable member connecting to the brake, a perforated disk connected to the slidable member and a locking dog adapted to engage any one of the perforations in the disk.

21. In a device of the class described, the combination with a brake, of a friction brake setting mechanism comprising a continuously rotatable non-slidable member, a slidable member connecting to the brake, a perforated disk connected to the slidable member and a spring pressed locking dog adapted to engage any one of the perforations in the disk.

22. In a device of the class described, the combination with a brake of a friction brake setting mechanism comprising a continuously rotatable non-slidable member, a slidable member connecting to the brake, a perforated disk connected to the slidable member, a locking dog adapted to engage any one of the perforations in the disk and mechanism for retracting the dog.

23. In a device of the class described, the combination with a brake of a friction brake setting mechanism comprising a continuously rotatable non-slidable member, a slidable member connecting to the brake, a perforated disk connected to the slidable member, a locking dog adapted to engage any one of the perforations in the disk and manually operative mechanism for retracting the dog.

24. In a device of the class described, the combination with a brake of a friction brake setting mechanism comprising a continuously rotatable non-slidable member, a slidable member connecting to the brake, a perforated disk connected to the slidable member, a locking dog adapted to engage any one of the perforations in the disk and mechanism for retracting the dog and sliding the slidable member.

25. In a device of the class described, the combination with a brake of brake setting mechanism including a cam and connecting means including a flexible element adapted to be wound on said cam in either direction to set the brake.

26. In a device of the class described, the combination with a brake, of brake setting mechanism including a cam which is in part in the form of a cardioid curve and connecting means including a flexible element adapted to be wound on said cam.

27. In a device of the class described, the combination with a brake, of brake setting mechanism including a cam having a groove in part substantially curved to a cardioid curve and connecting means including a flexible element adapted to be wound in said groove.

28. In a device of the class described, the combination with a brake, of a friction brake setting mechanism comprising two members an intermediate member having a cam end controlling means including an element having a cam end adapted to engage the cam end of the intermediate member, a locking element on one member and a locking dog carried by the intermediate member.

29. In a device of the class described, the combination with a brake, of a friction brake setting mechanism comprising two members, an intermediate member having a cam end, controlling means including an element having a cam end adapted to engage the cam end of the intermediate member a locking element on one member, and a locking dog mounted in a housing on the intermediate member.

30. In a device of the class described, the combination with a brake, of a friction brake setting mechanism comprising two or more members, an intermediate member having a cam end and controlling means including an element having a cam end adapted to engage the cam end of the intermediate member, the cam surfaces being complementary and of regular sinuous curvature.

31. In a device of the class described, a brake, friction brake setting means, locking means and a hand lever controlling both the friction brake setting means and the locking means.

32. In a device of the class described, a brake, brake setting means, locking means and a hand lever having a plurality of members controlling both the brake setting means and the locking means.

33. In a device of the class described, a brake, brake setting means, locking means and a hand lever controlling both the brake setting means and the locking means and having a plurality of members, one of which is connected to the locking means.

34. In a device of the class described, a brake, brake setting means, locking means and a hand lever controlling the brake setting means and having a plurality of members, one of which is connected to the locking means and has an independent movement to operate said locking means.

35. In a device of the class described, a brake, brake setting means, locking means, an operating lever and independent connections between the lever and the brake setting means and locking means.

36. In a device of the class described, a brake, brake setting means, locking means, an operating lever, a connection between the lever and the brake setting means and an independent connection between the lever and the locking means.

37. In a device of the class described, a brake, brake setting means, locking means, an operating lever and independent connections between the lever and the brake setting means and locking means; said connections being at least in part of flexible character.

38. In a device of the class described, a brake, brake setting means, locking means, an operating lever and independent connections between the lever and the brake setting means and locking means; said connections being at least in part wire rope.

39. In a device of the class described, a brake, a brake setting mechanism consisting of two friction members, a counter shaft, a car axle, a power transmitting element connecting the counter shaft to the car axle, a power transmitting element connecting the counter shaft to one of the friction members, means connecting the other friction member to the brake and means for moving the friction members into frictional contact.

WILLIAM C. MARSH.

Witnesses:
A. J. SANGSTER,
CHAS. L. HUTCHIN, Sr.